United States Patent [19]

Reid et al.

[11] 4,373,748
[45] Feb. 15, 1983

[54] SEAT BELT RETRACTING AND LOCKING MECHANISM

[75] Inventors: Kenneth H. Reid, Mt. Clemens; Bernard J. Finn, Troy, both of Mich.

[73] Assignee: General Motors Corporation, Detroit, Mich.

[21] Appl. No.: 201,514

[22] Filed: Oct. 28, 1980

[51] Int. Cl.³ .................. A62B 35/02; B65H 75/48
[52] U.S. Cl. .................... 280/806; 242/107.4 A;
24/194; 297/478; 297/480
[58] Field of Search .................. 280/806, 807, 808;
24/194, 244; 242/107.4 A; 297/468, 469, 476,
478, 480

[56] References Cited

U.S. PATENT DOCUMENTS 3,711,154  1/1973  Merola .............................. 297/468
4,164,337  8/1979  Blom ................................. 297/478

FOREIGN PATENT DOCUMENTS 1061903  3/1967  United Kingdom .

Primary Examiner—Richard A. Bertsch
Attorney, Agent, or Firm—Charles E. Leahy

[57] ABSTRACT

A linear belt storage retractor includes a locking mechanism attached to the end of the belt and travelling vertically inside a vertical tubular housing mounted on the vehicle body. The weight of the locking mechanism retracts the belt into the tubular housing. The locking mechanism includes a ramp member attached to the belt and having a ramp surface facing the inner wall of the tubular housing. A wedge member is seated upon the ramp surface and moves radially relative the inner wall upon axial movement relative the ramp member. A platform engages the wedge member and is spring biased to support the wedge member at a normal position away from the inner wall. Upon occurrence of ramp member acceleration with the belt in the belt extending direction, the resting inertia of the wedge member and platform overcomes the spring so that movement of the wedge member lags behind the ramp member and the ramp member forces the wedge member radially outward to initiate self actuating frictional locking engagement of the wedge member with the inner walls to lock the ramp member against belt extending movement. A pendulum acts upon the platform to move the wedge member axially relative the ramp member in response to a vehicle deceleration so that the wedge member moves radially to engage the inner wall and thereby initiate self actuating frictional locking engagement to lock the belt against belt extending movement.

3 Claims, 4 Drawing Figures

SEAT BELT RETRACTING AND LOCKING MECHANISM

The invention relates to a seat belt retractor and more particularly to a linear belt storage retractor having a locking mechanism sensitive to vehicle deceleration and belt acceleration.

BACKGROUND OF THE INVENTION

It is well known to provide a restraint belt for restraining a vehicle occupant upon a vehicle seat. It is also well known to provide a belt retractor comprised of a belt carriage which traverses a linear track mounted on the vehicle body and a locking mechanism which selectively locks the carriage to the track.

The present invention provides a new and improved linear belt storage and retracting mechanism for extending and retracting a belt and locking the belt at a fixed length in response to the sensed occurrence of a predetermined magnitude of vehicle deceleration, or of belt acceleration in the belt unwinding direction.

SUMMARY OF THE INVENTION

According to the invention, a locking mechanism attached to the end of the belt travels vertically inside a tubular housing mounted vertically on the vehicle body. The weight of the locking mechanism retracts the belt into the tubular housing. The locking mechanism includes a ramp member having a ramp surface facing the inner wall of the tubular housing. A wedge member is seated upon the ramp surface and moves radially relative the inner wall upon axial movement relative the ramp member. A platform engages the wedge member and is spring biased to support the wedge member at a normal position away from the inner wall. Upon occurrence of ramp member acceleration with the belt in the belt extending direction, the resting inertia of the wedge member and platform overcomes the spring so that movement of the wedge member lags behind the ramp member and the ramp member forces the wedge member radially outward to initiate self actuating frictional locking engagement of the wedge member with the inner walls to lock the ramp member against belt extending movement. A pendulum acts upon the platform to move the wedge member axially relative the ramp member in response to vehicle deceleration so that the wedge member moves radially to engage the inner wall and thereby initiate self actuating frictional locking engagement to lock the belt against belt extending movement.

The object, feature and advantage of the invention resides in the provision of a belt retracting mechanism comprised of a locking mechanism which traverses the inside of a vertical tube and is expanded radially to frictionally engage the tube upon occurrence of belt extending acceleration or vehicle deceleration.

BRIEF DESCRIPTION OF THE DRAWINGS

These and other objects, features and advantages of the invention will become more apparent upon consideration of the specification and the appended drawings in which.

DESCRIPTION OF THE PREFERRED EMBODIMENT

Figure 1:
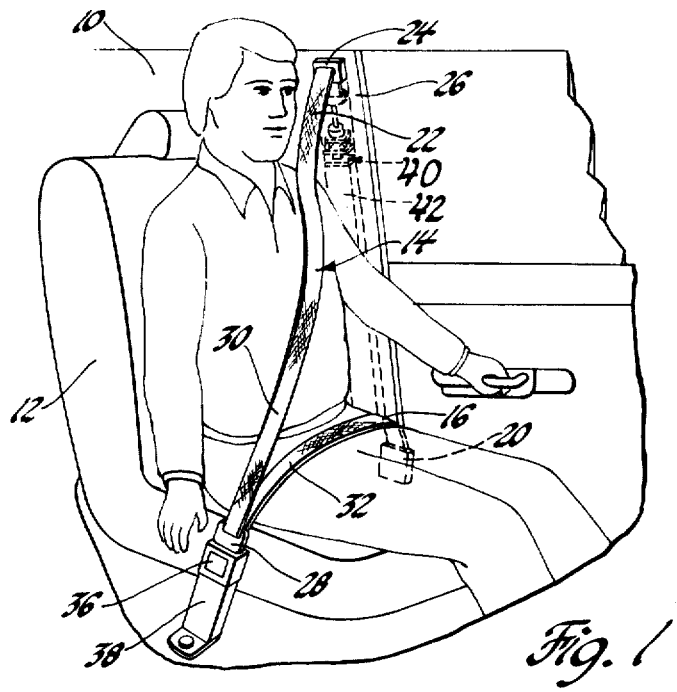
FIG. 1 is a sectional view of the vehicle body having a seat belt retracting and locking mechanism according to the invention.

Referring to FIG. 1, there is shown a motor vehicle body 10 in which an occupant seat 12 is conventionally mounted. A restraint belt system for restraining an occupant in the seat 12 includes a continuous-loop belt 14 having a lower end 16 attached to the sill structure of the vehicle body outboard the seat by a mounting bracket 20. The upper end 22 of the belt passes through a guide plate 24 mounted on the pillar structure 26 of the vehicle body. A latch plate 28 is slidable along the continuous-loop belt 14 and divides the belt 14 into a shoulder belt 30 and a lap belt 32 when the latch plate 28 is engaged within a buckle 36 mounted inboard the seat by a mounting strap 38.

Figure 2:
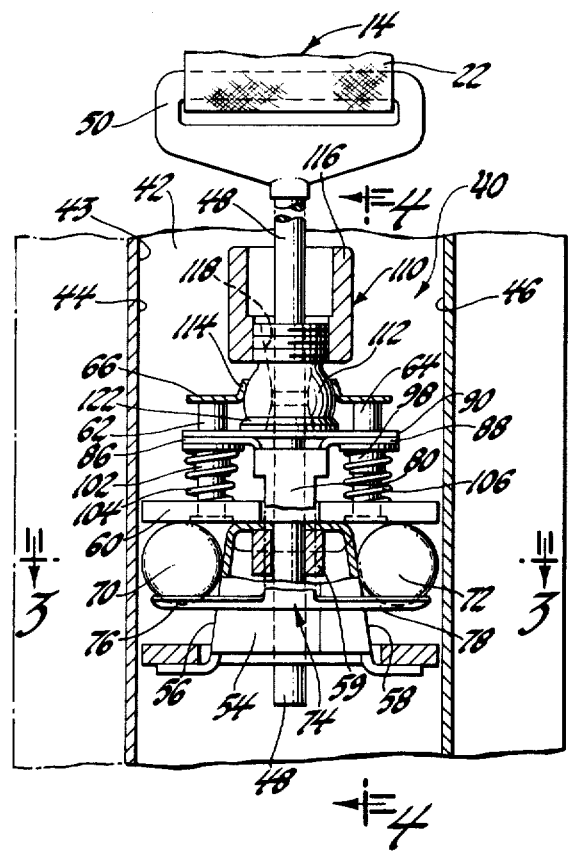
FIG. 2 is an enlarged fragmentary sectional view of the seat belt locking mechanism.

The upper end 22 of the belt extends into a rectangular tube 42 and is connected to a locking mechanism 40. The tube 42 is attached to the pillar 26 and extends vertically from the vehicle floor to the guide plate 24. The tube 42 has a central axial passage 43 defined by opposed facing inner walls 44 and 46 of the tube 42. Referring to FIG. 2, it is seen that the end of the belt 22 is attached to a rod 48 of locking mechanism 40 by a belt loop 50. A ramp member 54 encircles the rod 48 and has outward facing angularly inclined ramp surfaces 56 and 58 which face respectively towards the inner walls 44 and 46 of the tube 42. Ramp member 54 is attached to the rod 48 by a sleeve 59 which is swaged to the rod 48. A rectangular support plate 60 rests upon the ramp member 54 and carries a pair of guide pins 62 and 64 which are press fit therein and extend upwardly therefrom. A journal plate 66 is suitably attached to the upper ends of the guide pins 62 and 64.

Figure 3:
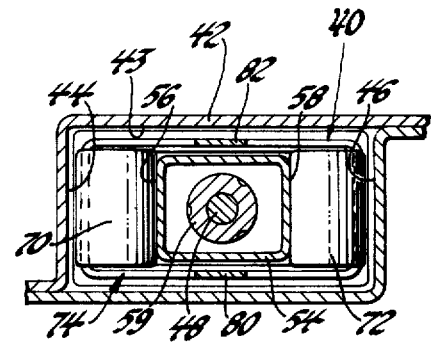
FIG. 3 is a sectional view taken in the direction of the arrows 3—3 of FIG. 2.
Figure 4:
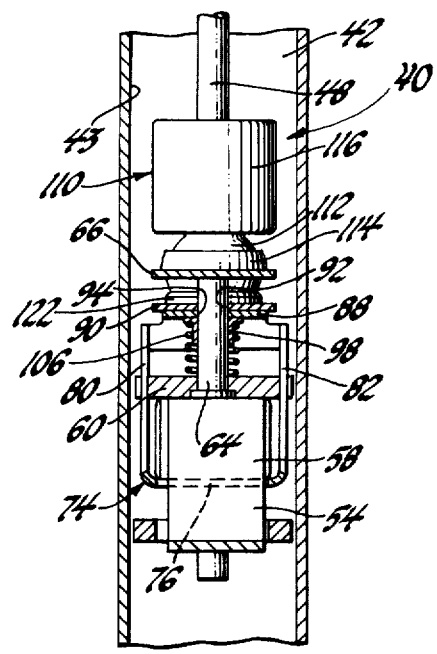
FIG. 4 is a sectional view taken in the direction of arrows 4—4 of FIG. 2.

As best seen in FIGS. 2 and 3, a roller 70 is interposed between the tube inner wall 44 and the inclined surface 56 of the ramp member 54. A like roller 72 is interposed between the tube inner wall 46 and the ramp surface 58 of the ramp member 54. A platform member 74 is provided to lift the rollers 70 and 72 away from simultaneous engagement with the tube 42 and ramp member 54. The platform member 74 includes a limb 76 which extends beneath roller 70 and limb 78 which extends beneath the roller 72. The platform member legs 80 and 82 extend upwardly from the limbs 76 and 78. Arms 86 and 88 extend outwardly from the legs 80 and 82. A connecting plate 90 extends between the arms 86 and 88. The pin 64 passes through aligned apertures 92 and 94 provided in the plate 90 and arm 88 as best shown in FIG. 4. Similar apertures are provided in the arm 86 and plate 90 for the guide pin 62. A guide bushing 98 surrounds the guide pin 64 and is welded or otherwise attached to the arm 88 as seen in FIG. 4. A similar guide bushing 102 surrounds the guide pin 62 and is suitably attached to the arm 86. The guide bushings 98 and 102 cooperate respectively with the guide pins 64 and 62 to mount the platform member 74 for axial movement relative the ramp member 54. Coil compression springs 104 and 106 respectively encircle the guide pins 62 and 64 to bias the platform member 74 to the normal position of FIG. 2 in which the rollers 70 and 72 are lifted into contact with the plate 60 and away from simultaneous engagement with the tube inner walls 44 and 46 and the ramp surfaces 56 and 58 of the ramp member 54.

Referring to FIGS. 2 and 4 it is seen that a pendulum assembly 110 includes a spherical portion 112 which seats in a conical flange 114 of the plate 66. The spherical portion 112 and a weight 116 threadedly attached thereto have a bore 118 therethrough which is concentric with the rod 48. A ring 122 of the spherical portion 112 seats against the connecting plate 90 so that tilting movement of the pendulum assembly 110 from the position shown in FIGS. 2 and 4 will move the platform member 74 downwardly relative the rod 48 and ramp member 54.

OPERATION

Referring to FIG. 1, it will be understood that unbuckling of the buckle 36 permits the shoulder belt 30 to be retracted through the guide plate 24 into the tube 42. The retracting effort is provided by the weight of the locking mechanism attached to the upper end 22 of the belt 14 by the belt loop 50 and rod 48. Referring to FIG. 2, it is seen that the springs 104 and 106 normally urge the platform member 74 to the position shown in the drawings in which the limbs 76 and 78 support the rollers 70 and 72 in contact with the plate 60. Accordingly, the rollers 70 and 72 may contact either the ramp surfaces 56 and 58 of the ramp member 54 or the tube inner walls 44 and 46 of the tube 42, but not both. The limbs 76 and 78 of the platform member preferably have slight depressions which position the rollers 70 and 72 radially in contact with the ramp surfaces 56 and 58 instead of the tube inner walls 44 and 46 to facilitate axial movement of the locking mechanism within the tube 42.

The occurrence of a vehicle deceleration condition of predetermined magnitude causes the pendulum assembly 110 to pivot about its spherical portion 112. Pivoting of the pendulum assembly 110 causes the ring 122 thereof to press downwardly on the connecting plate 90 and the arms 86 and 88 of the platform member 74 against the bias of the springs 104 and 106. The concomitant downward movement of the platform member limbs 76 and 78 permit the rollers 70 and 72 to move axially down the ramp member rolls 56 and 58 and radially outwardly against the tube inner walls 44 and 46. Extending movement of the belt and the ramp member 54 upon imposition of occupant restraint load on the belt initiates self energizing frictional lockup of the rollers 70 and 72 against the tube inner walls 44 and 46. Accordingly the belt 14 is locked against movement in the belt extending direction.

Upon cessation of the vehicle deceleration condition the coil compression springs 104 and 106 restore the normal axial position of the platform member 74 so that the rollers 70 and 72 are disengaged from wedging engagement with the tube 42.

The belt is also locked against extension upon occurrence of a rapid extending movement of the belt. During such rapid extension of the belt, the rod 48 and the ramp member 54 are jerked upwardly. The resting inertia of the platform member 74 and the rollers 70 and 72 causes the rollers 70 and 72 to lag behind the motion of the ramp member 54 as permitted by yielding of the coil compression springs 104 and 106. Accordingly, the rollers 70 and 72 become progressively wedged between the tube inner walls 44 and 46 and the inclined walls 56 and 58 of the ramp member 54 in proportion to the occupant restraint load imposed upon the belt. Upon cessation of the rapid belt extension, the coil compression springs 104 and 106 restores the normal axial positions shown in FIGS. 2 and 4 so that the belt is again unlocked for belt extending movement.

Thus, the invention provides a new and improved seat belt retracting and locking mechanism.

While the invention has been disclosed primarily in the terms of specific embodiment shown in the drawing, it is not intended to be limited thereto, but rather only to the extent set forth in the appended claims.

The embodiments of the invention in which an exclusive property or privilege is claimed are defined as follows:

1. A restraint belt retracting mechanism comprising:
   a tubular housing mounted in vertical orientation on the vehicle body and having a central axial extending passage therethrough defined by an inner wall;
   a ramp member carried by the belt and movable axially within the housing during belt extension and retraction, said ramp member having a ramp surface facing the housing inner wall;
   a wedge member interposed between the housing inner wall and the ramp member and engaging the ramp surface thereof so that the wedge member is moved radially relative the inner wall upon axial movement relative the ramp member;
   spring means urging the wedge member to a normal position spaced away from the inner wall and being yieldable upon occurrence of belt and ramp member acceleration causing movement of the wedge member in the belt extending direction to lag behind the ramp member so that the wedge member is forced radially outward by the ramp surface to forcibly engage the inner wall and lock the ramp member and belt against belt extending movement;
   an inertia sensing means responsive to vehicle deceleration and adapted to effect axial movement of the wedge member relative the ramp member and concomitant radial outward movement thereof into engagement with the inner wall to lock the ramp member and restraint belt against belt extending movement.

2. A restraint belt retracting mechanism comprising:
   a tubular housing mounted in vertical orientation on the vehicle body and having an axial passage therethrough defined by an inner wall;
   a ramp member carried by the belt and movable axially within the housing during belt extension and retraction, said ramp member having a ramp surface inclined angularly relative the inner wall in spaced relation therefrom;
   a wedge member interposed between the housing inner wall and the ramp member and engaging the ramp surface thereof so that the wedge member moves radially relative the inner wall upon axial movement relative the ramp member;
   a platform member mounted for axial movement relative the ramp member and adapted to move the wedge member axially of the ramp member;
   spring means acting between the ramp member and the platform member to establish the wedge member at a normal axial position spaced radially away from the inner wall, said spring yielding upon occurrence of belt acceleration in the belt extending direction causing the platform member and wedge member to lag behind the ramp member so that the wedge member is forced radially outward by the ramp surface to frictionally engage the inner wall whereby the belt extending effort further actuates engagement of the wedge member against the inner wall to lock the ramp member and belt against belt extending movement;

and pendulum means acting between the ramp member and the platform member and responsive upon occurrence of a predetermined level of vehicle deceleration to move the wedge member axially relative the ramp member and into engagement with the inner wall to frictionally engage the inner wall whereby the belt extending effort further actuates engagement of the wedge member against the inner wall to lock the ramp member and restraint belt against belt extending movement.

3. A restraint belt retracting mechanism comprising:

a tubular housing mounted in vertical orientation on the vehicle body and having an axial passage therethrough defined by first and second opposed facing inner walls;

a ramp member carried by the belt and movable axially within the housing during belt extension and retraction, said ramp member having first and second ramp surfaces inclined respectively toward the first and second inner walls;

first and second rollers engaging the first and second ramp surfaces for radial movement relative the inner wall upon axial movement relative the ramp member;

a platform member mounted for axial movement relative the ramp member and adapted to move the first and second rollers axially of the ramp member;

spring means acting between the ramp member and the platform member to normally establish the first and second rollers spaced away from the inner wall to enable belt extension, said spring means being yieldable upon occurrence of a predetermined level of belt acceleration in the belt extending direction causing the platform member and first and second rollers to lag behind movement of the ramp member so that the first and second rollers are forced radially outward by the ramp surface to initiate self actuating engagement of the first and second rollers with the first and second inner walls to lock the ramp member and belt against belt extending movement;

and pendulum means acting between the ramp member and the platform member and effective upon vehicle deceleration to move the first and second rollers radially outward to initiate self actuating engagement with the first and second inner walls to lock the ramp member and belt against belt extending movement.

* * * * *